United States Patent
Huang et al.

(10) Patent No.: US 6,421,641 B1
(45) Date of Patent: Jul. 16, 2002

(54) METHODS AND APPARATUS FOR FAST ADAPTATION OF A BAND-QUANTIZED SPEECH DECODING SYSTEM

(75) Inventors: Jing Huang, Ossining; Mukund Padmanabhan, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,932

(22) Filed: Nov. 12, 1999

(51) Int. Cl.[7] ............................................. G10L 17/00
(52) U.S. Cl. ..................... 704/250; 704/230; 704/249
(58) Field of Search ................. 714/246, 255, 714/256, 257, 240, 250, 230, 249, 200

(56) References Cited

U.S. PATENT DOCUMENTS

| | | | |
|---|---|---|---|
| 5,199,077 A | * 3/1993 | Wilcox et al. | 704/243 |
| 5,522,011 A | 5/1996 | Epstein et al. | 704/222 |
| 5,793,891 A | * 8/1998 | Takahashi et al. | 382/156 |
| 5,839,105 A | * 11/1998 | Ostendorf et al. | 704/231 |
| 6,023,673 A | 2/2000 | Bakis et al. | 704/231 |

OTHER PUBLICATIONS

C.J. Leggetter et al., "Flexible Speaker Adaptation Using Maximum Likelihood Linear Regression," Proceedings of ARPA Spoken Language Technology Workshop, Barton Creek, pp. 1–6, 1995.

J–L. Gauvain et al., "Maximum a Posteriori Estimation For Multivate Gaussian Mixture Observations of Markov Chains," IEEE Transactions of Speech and Audio Processing, vol. 2, No. 2, pp. 291–298, Apr. 1994.

* cited by examiner

*Primary Examiner*—Richemond Dorvil
(74) *Attorney, Agent, or Firm*—Paul J. Otterstedt; Ryan, Mason & Lewis, LLP (57) ABSTRACT

A method of performing speaker adaptation of acoustic models in a band-quantized speech recognition system, wherein the system including one or more acoustic models represented by a feature space of multi-dimensional gaussians, whose dimensions are partitioned into bands, and the gaussian means and covariances within each band are quantized into atoms, comprises the following steps. A decoded segment of a speech signal associated with a particular speaker is obtained. Then, at least one adaptation mapping based on the decoded segment is computed. Lastly, the at least one adaptation mapping is applied to the atoms of the acoustic models to generate one or more acoustic models adapted to the particular speaker. Accordingly, a fast speaker adaptation methodology is provided for use in real-time applications.

24 Claims, 5 Drawing Sheets

METHODS AND APPARATUS FOR FAST ADAPTATION OF A BAND-QUANTIZED SPEECH DECODING SYSTEM

FIELD OF THE INVENTION

The present invention relates generally to speech recognition systems and, more particularly, to methods and apparatus for providing fast speaker adaptation of acoustic models used in these systems.

BACKGROUND OF THE INVENTION

The performance of a general speaker-independent (SI) system is often poor for specific tasks in automatic speech recognition (ASR). Speaker adaptation techniques have recently emerged as both effective and practical methods to improve the performance of an ASR. For instance, for telephony tasks, adaptation could improve the performance significantly by compensating for the uncertainty and other effects of the telephone channel.

The most common techniques for adaptation change the acoustic models used in speech recognition using samples of speech data from a particular speaker or environment. These acoustic models attempt to model the probability density function (pdf) of acoustic feature vectors for different sounds (phones). It is common to use parametric pdf's such as gaussians to approximate the true pdf of the data. These gaussians are parametrized by means ($\mu_i$, i=1, . . . , N) and covariances ($\Sigma_i$, i=1, . . . , N) in high dimensional (D-dimensional) feature space.

One common technique to adapt the gaussians is maximum likelihood linear regression (MLLR) adaptation. MLLR adaptation is described in C. J. Legetter and P. C. Woodland, "Maximum Likelihood Linear Regression for Speaker Adaptation of Continuous density HMM's," Computer Speech and Language, vol. 9, no. 2, pp. 171–186, 1995, the disclosure of which is incorporated herein by reference. In this technique, the adapted gaussians that better model the speakers data are assumed to be derivable from the speaker independent gaussians by the application of an affine transform. Consequently, if $\mu_i$ represents one of the speaker independent gaussians, the speaker-adapted gaussian is assumed to be $\hat{\mu}_i = A\mu_i$ where A is a D×D dimensional matrix and $\mu_i$ is a D×1 dimensional vector.

Another common technique that is used in speaker adaptation is maximum a posteriori (MAP) adaptation. MAP adaptation is described in J. L. Gauvain and C. H. Lee, "Maximum-a-Posteriori estimation for multivariate gaussian observations of Markov chains," IEEE Trans. Speech and Audio Processing, vol. 2, no. 2, pp. 291–298, April 1994, the disclosure of which is incorporated herein by reference. Here, the features vectors in the adaptation data are assigned (with some probability) to the gaussians of the speaker independent system, and based on this assignment, the zero-th, first and second order statistics are accumulated for each gaussian. These accumulated statistics are then smoothed back with the sufficient statistics of the gaussians as computed from the training data (from which the gaussians were estimated), and the smoothed statistics are then converted into the means and covariances of the adapted gaussians.

For telephony applications, adaptation raises two concerns. First, typically, there is only as little as two seconds of data from which to adapt. This makes it imperative, especially for real-time applications, that the adaptation be fast. Second, with so little data, many of the parameters required for MLLR or MAP cannot be robustly estimated.

Since most of the telephony tasks mandate real-time processing, the SI system has to be implemented in a way that allows fast computation of gaussian likelihood values. It is to be understood that a system usually has tens of thousands of gaussians. The full computation associated with these gaussians is prohibitively expensive. One common approach to speed up the computation is to organize the gaussians in a hierarchical fashion so that only a subset of the gaussians need to be computed at any time. This is called hierarchical clustering of gaussians. Furthermore, the parameter space (means and covariances) of the gaussians is quantized. The gaussians model probability density functions in a D-dimensional feature space. These dimensions are divided into subsets of dimensions (called bands) and the gaussian's parameters (means, variances and priors) in each band are vector quantized. This is referred to as a band-quantized (BQ) system. Typically, D is 40 dimensional, there are 20 bands with 2 dimensions in each band, and the gaussians of the original system in each band are quantized into 128 bins (referred to as atoms, hence atoms represent quantized gaussians in two dimensions). The original gaussians are now represented by the closest atom in each band.

The process of computing the likelihood of a feature vector for a given gaussian is now as follows. For each band, the likelihood of the feature vector values in the band is computed for each atom in that band (this represents the computation of 128*20 2-dimensional gaussian likelihoods). Subsequently, the likelihood for the original gaussian is obtained by looking up the likelihood values of the atoms associated with the gaussian. Hence, the BQ system stores each gaussian as an index mapping (array of indices) to atoms, and also the hierarchy of mappings in the hierarchical clustering.

By way of example, the standard procedure for MLLR adaptation with the BQ system is as follows. The means (and possibly covariances) of the Dimensional gaussians are transformed into a new set of gaussians. Subsequently, based on acoustic similarity, these gaussians are clustered into hierarchical groups. Finally, for each band, the new gaussians are vector quantized to form a set of atoms. Unfortunately, this process cannot meet the real-time requirements of various applications such as, for example, telephony applications.

SUMMARY OF THE INVENTION

The present invention provides for methods and apparatus for improved speaker model adaptation with application to a speech recognition system that uses band quantized gaussians for the acoustic model. In most techniques, the speaker adapted gaussians are derived from the complete un-quantized speaker independent gaussians by some technique, and the speaker adapted gaussians are then re-quantized. The mapping of speaker independent gaussians to speaker adapted gaussians may be through an affine transformation (MLLR) or through other technique (such as the smoothing of counts, as in MAP adaptation). The present invention is applicable to all these techniques.

In the present invention, we impose certain constraints on the mapping function that are related to the division of dimensions into bands. These constraints enable the mapping function to be computed on the basis of the un-quantized gaussians, but then enable the mapping to be applied directly onto the atoms of the quantized speaker independent system, hence eliminating the overhead of having to re-quantize the adapted gaussians.

Advantageously, in accordance with the invention, by applying the adaptation directly to the atoms, the hierarchy and index mappings are left unchanged. When the mapping is properly designed with respect to the partitioning of the original feature space into bands, the computation of the transform becomes easy and hence the adaptation is fast. Additionally, since the number of adapted parameters is fairly small, the process is also more robust.

In one embodiment of the invention, the mapping function is assumed to be an affine transform, i.e., the parameters of the adapted gaussians are related to the speaker independent parameters by means of an affine transform. The application of our invention to this mapping function constrains the transformation to be block diagonal with the blocks corresponding to the dimension-bands in the system. The transforms are computed in order to maximize the likelihood of the adaptation data, or alternately some other objective function, e.g., a Bayesian likelihood, discrimination, etc., may also be used to compute the transform in accordance with the invention. It is to be understood that the adaptation data may be a short decoded sequence of speech from the speaker for whom the acoustic models are being adapted.

In another embodiment of the invention, the mapping function is assumed to maximize the Bayesian likelihood of the adaptation data (i.e., the probability of the class conditioned on the acoustic observations). This adaptation process requires the assignment (with some probability) of each feature vector in the adaptation data to a class, and the accumulation of the first and second order statistics of the feature vectors for each atom. The probability of assigning a feature vector to a class is computed using the quantized speaker independent gaussians. The sufficient statistics collected from the adaptation data for each atom are smoothed back to the sufficient statistics of the speaker independent atoms, and the smoothed statistics are then converted into gaussians which represent the new atoms.

The real-time adaptation techniques of the invention maybe employed in any suitable automatic speech recognition system for use in a variety of applications such as, for example but not limited to, telephony applications.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

The present invention will be explained below in the context of an illustrative speaker independent, band-quantized speech recognition or decoding system. However, it is to be understood that the present invention is not limited to this or any particular speech recognition system. Rather, the invention is more generally applicable to any suitable speech recognition system in which it is desirable to realize increased recognition performance via improved real-time speaker model adaptation. By way of example only, generalized speech recognition systems such as the commercially available large vocabulary IBM ViaVoice or ViaVoice Gold systems (trademarks of IBM Corporation of Armonk, N.Y.) may be adapted to permit and/or perform real-time speaker model adaptation in accordance with the invention.

Figure 1:
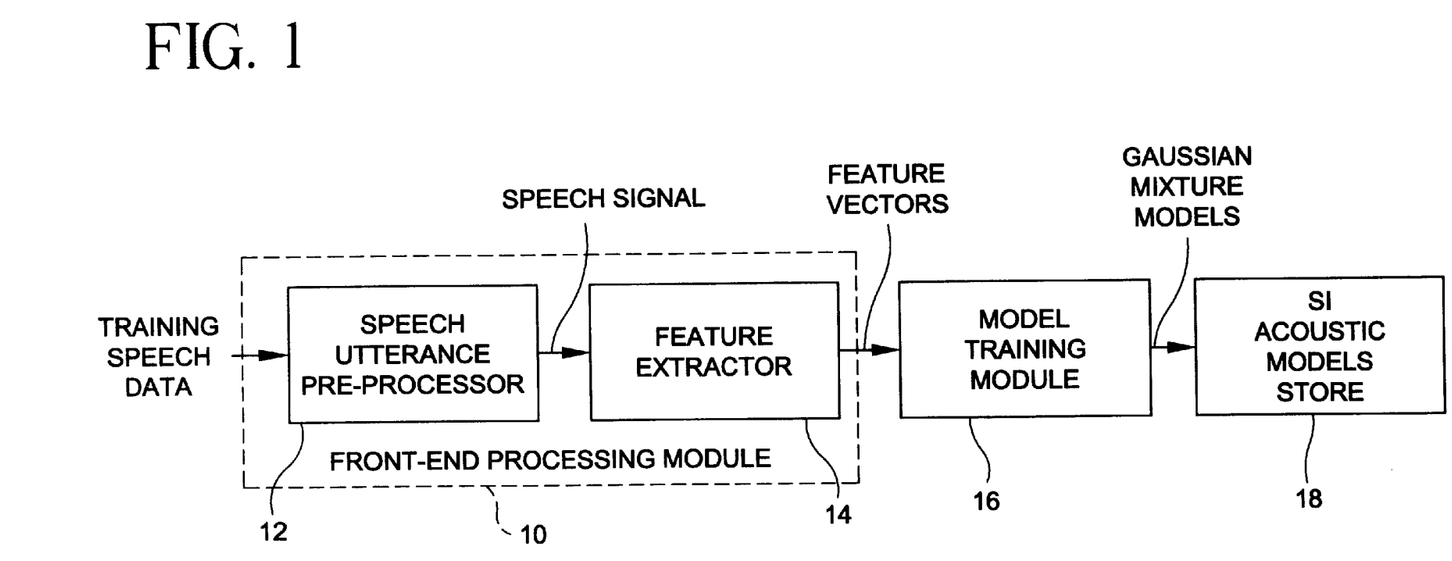
FIG. 1 is a block diagram of an illustrative speaker independent, band-quantized speech recognition system for training acoustic models.
Figure 2:
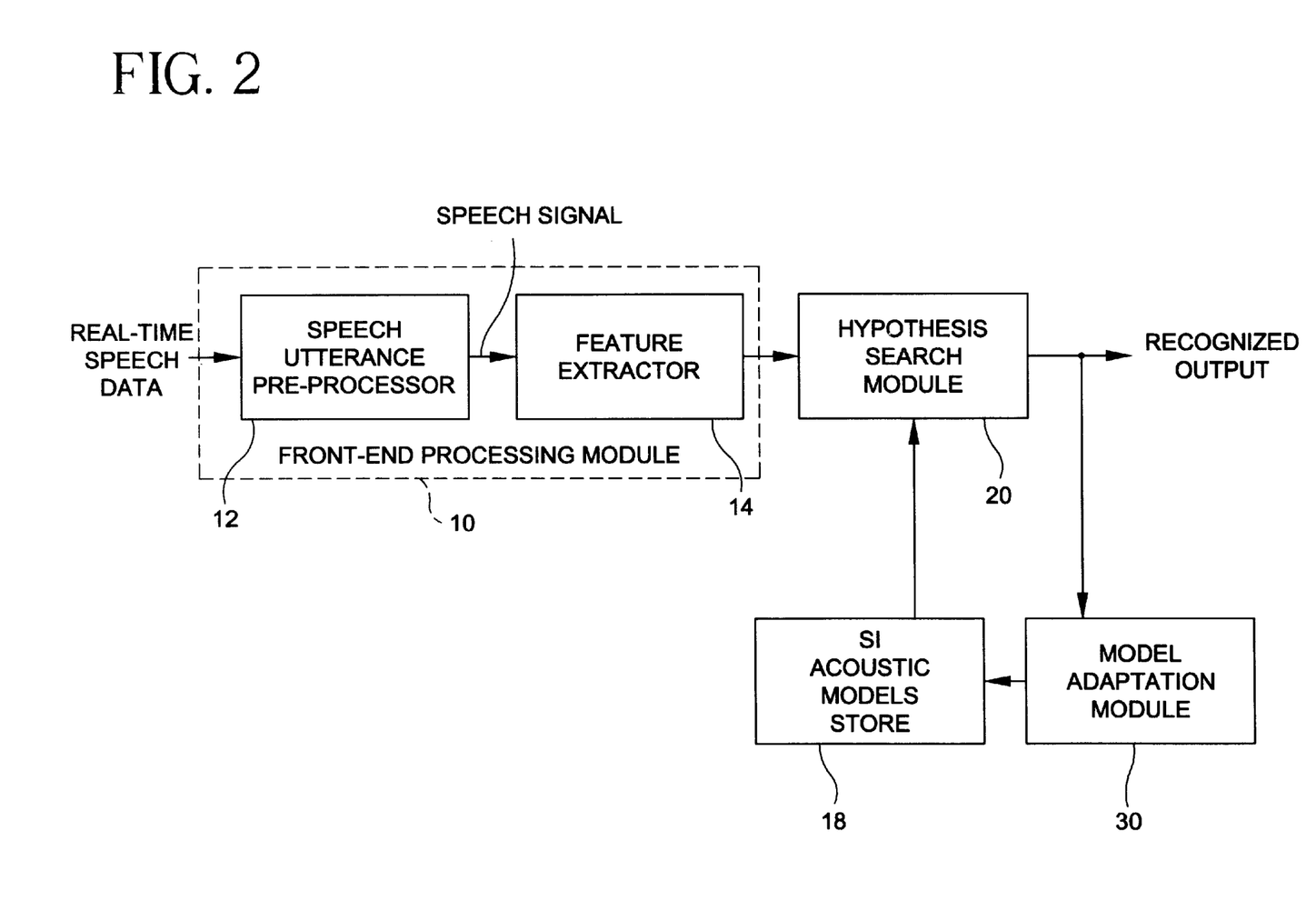
FIG. 2 is a block diagram of an illustrative speaker independent, band-quantized speech recognition system employing a speaker adaptation methodology according to the invention.

Before explaining an illustrative speaker model adaptation embodiment of the invention, a brief explanation of the functionality of the components of an illustrative speaker independent, band-quantized speech recognition system will now be given. FIG. 1 depicts the system in a training mode, while FIG. 2 depicts the system in a real-time recognition mode.

Referring initially to FIG. 1, a block diagram is shown of an illustrative speaker independent, band-quantized speech recognition system for training acoustic models. The system in a training mode comprises a front-end processing module 10 which includes a speech utterance pre-processor 12 and a feature extractor 14. The system also includes a model training module 16 and a speaker independent acoustic model store 18. The speech recognition system uses training data to train acoustic models which are used during real-time decoding operations. As is known, a speaker independent speech recognition system is a speech recognition system which is trained using training data derived from many speakers. Such a training process attempts to capture average statistics across these speakers. This is to be distinguished from a speaker dependent system which is trained using training data from the specific individual who will be using the system.

The speech utterance pre-processor 12 receives training speech data and generates representative speech waveforms, i.e., a speech signal. The speech utterance pre-processor 12 may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor 12 is the sampled speech waveforms or speech signal which is recorded and provided to a feature extractor 14.

The feature extractor 14 receives the speech signal and, as is known in the art, extracts spectral features from the signal at regular intervals, for example, about every 10 milliseconds. The spectral features are in the form of feature vectors (signals) which are then passed on to a model training module 16. As is also known in the art, the feature vectors representing the training data are used to train acoustic models such as, for example, band-quantized gaussian mixture models, which are then used by the system to decode speech data received during the course of a real-time application. These models are stored in acoustic models store 18.

Referring now to FIG. 2, the speaker independent, band-quantized speech recognition system is depicted in a real-time recognition mode. Specifically, FIG. 2 shows such an illustrative system employing a speaker model adaptation methodology according to the invention. The system comprises the front-end processing module 10 which includes the speech utterance pre-processor 12 and the feature extractor 14, and the acoustic models store 18. These are the same components of the system mentioned above in the training mode. Additionally, the system comprises a hypothesis search module 20 and a model adaptation module 30.

The front-end processing module 10 performs similar operations as mentioned above except, in this case, it is on real-time speech data, for example, speech data associated with a telephony application. As is known, the hypothesis search routine performed by the module 20 is substantially controlled by four components: (i) an acoustic vocabulary (not shown); (ii) a language model vocabulary (not shown); (iii) acoustic models 18; and (iv) a language model (not shown). Specifically, the hypothesis search routine hypothesizes a sequence of words from the acoustic vocabulary and computes a score for the hypothesis. Subsequently, the hypothesis with the best score is output as the recognized or decoded sequence. The process of computing the score consists of two steps: (i) computing an acoustic model score; and (ii) computing a language model score. The language model score is related to linguistic constraints and tries to capture the grammatical constraints in the particular language. The acoustic model score relates to the probability distribution of the feature vectors for a given hypothesis. The probability of a sequence of feature vectors is computed using a parameterized probability density function (i.e., gaussians), and this constitutes the acoustic model score. The acoustic and language vocabularies define the words that can be used to construct the hypothesis.

The model adaptation module 30, as shown in FIG. 2, performs the methodologies of the invention, as will be illustratively explained below, to adapt the acoustic models to the particular speaker providing the real-time speech data in order to improve the speech recognition performance of the system with respect to that speaker. Thus, using a short segment of real-time speech data from the speaker, the system adapts its acoustic models to the speaker. This adaptation can be performed once or it can be iteratively performed with multiple segments of speaker-provided speech data.

Figure 3:
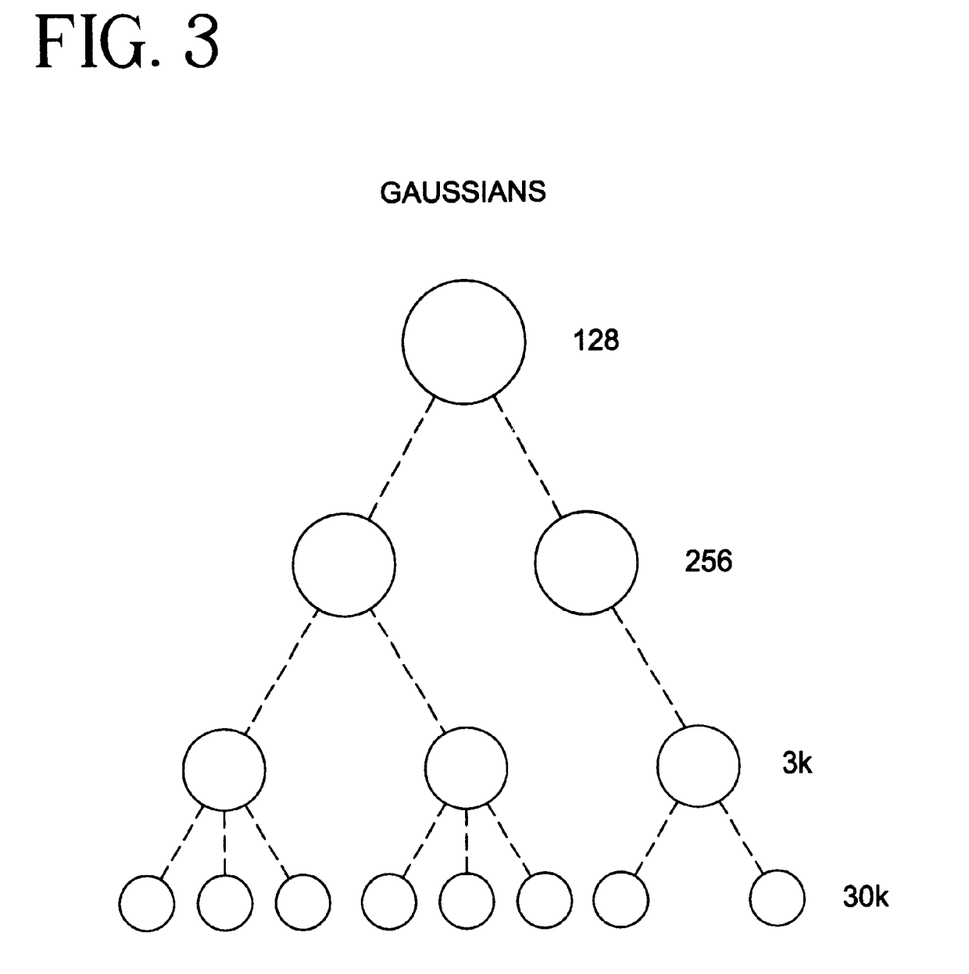
FIG. 3 is a diagram of a gaussian mixture model for use in a speaker independent, band-quantized speech recognition system.

FIG. 3 depicts an exemplary gaussian mixture model for use in a speaker independent, band-quantized speech recognition system. The model may be formed as explained above in the background section. To summarize, the gaussians are organized in a hierarchical fashion so that only a subset of the gaussians need to be computed at any time, i.e., hierarchical clustering of gaussians. The parameter space of the gaussians is quantized. The gaussians model probability density functions in a D-dimensional feature space. These dimensions are divided into subsets of dimensions or bands and the gaussian's parameters (means, variances and priors) in each band are vector quantized. Thus, a system using such models is referred to as a band-quantized system. Again, D is preferably 40 dimensional, with 20 bands with 2 dimensions in each band, and the gaussians of in each band are quantized into 128 bins or atoms. Hence, atoms are quantized gaussians in two dimensions. The gaussians are now represented by the closest atom in each band.

Figure 4:
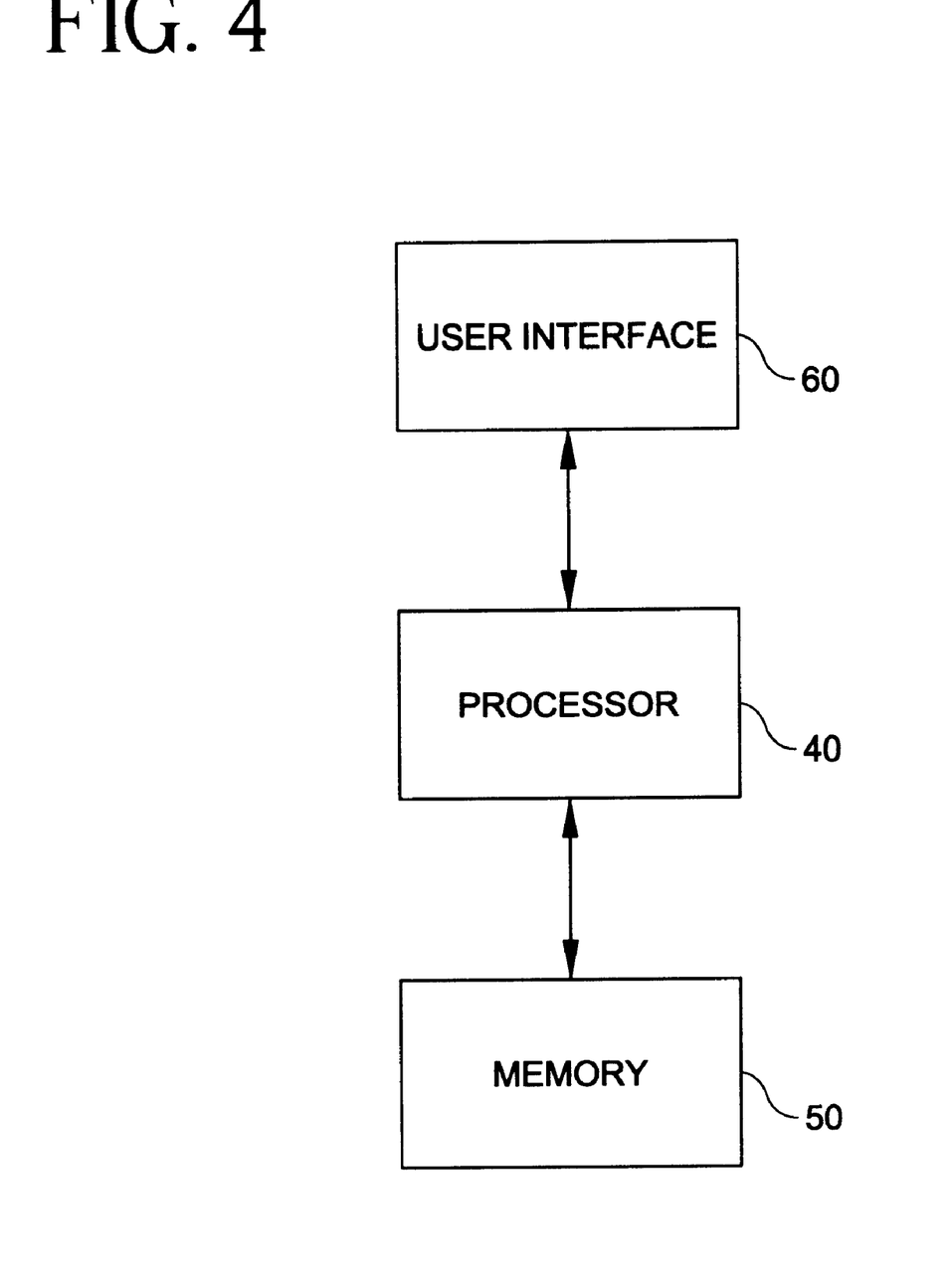
FIG. 4 is a block diagram of an illustrative hardware implementation of a speaker independent, band-quantized speech recognition system employing a speaker adaptation methodology according to the invention.

Referring now to FIG. 4, a block diagram of an illustrative hardware implementation of a speech recognition system employing a speaker model adaptation methodology according to the invention (e.g., as illustrated in FIGS. 1 and 2) is shown. In this particular implementation, a processor 40 for controlling and performing training, speech decoding and speaker adaptation is coupled to a memory 50 and a user interface 60. It is to be appreciated that the term "processor" as used herein is intended to include any processing device, such as, for example, one that includes a CPU (central processing unit). For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 60 may also include a portion of the speech utterance pre-processor 12 (FIGS. 1 and 2) such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 and 2 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Given the above-described illustrative speech recognition system, an illustrative method of performing fast speaker adaptation in a speaker independent, band-quantized speech recognition system will now be explained.

Figure 5:
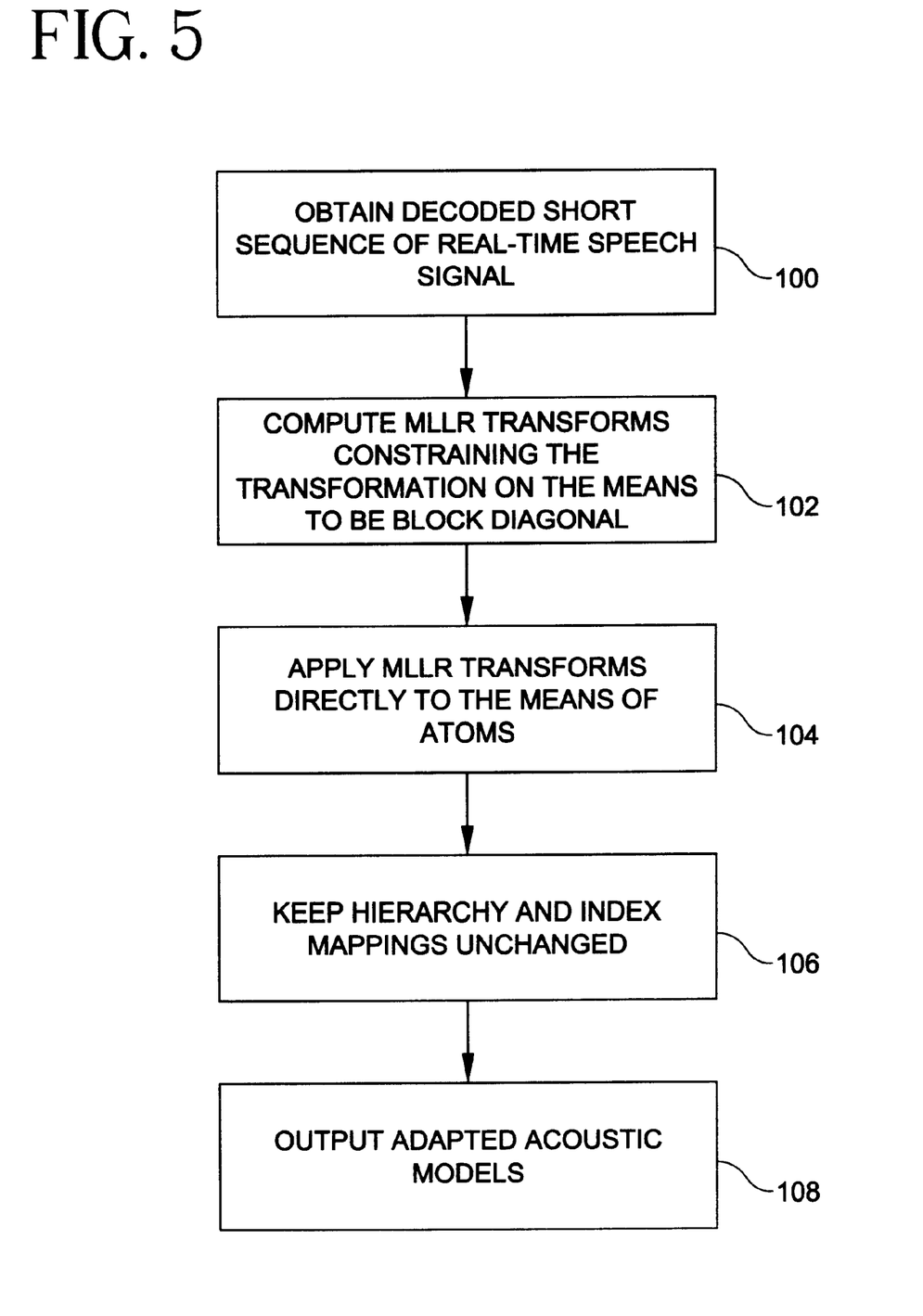
FIG. 5 is a flow diagram of an illustrative speaker adaptation methodology according to the invention.

Referring now to FIG. 5, a flow diagram of an illustrative speaker adaptation methodology according to the invention is shown. As previously mentioned, it is to be appreciated that such a speaker adaptation methodology may be performed in the model adaptation module 30 shown in FIG. 1.

In step 100, a short sequence of the real-time speech signal, preferably about two seconds long, is obtained. The speech recognition system, as initially trained, is used to decode the sequence.

The decoded test script associated with the sentence is then used in step 102 to compute a transform that may be applied to the means of the gaussians. The rationale for this is based on the assumption that the means and covariances of the speaker adapted gaussians are related to the speaker independent gaussians through linear transforms. The transformations are computed to maximize an objective function that could be a likelihood (as in MLLR) or a probability of a class assignment conditioned on the acoustic observations (MAP) or some form of a discriminant function. In one preferred embodiment, the transformations are constrained to be block diagonal with the blocks corresponding to the bands used in the band-quantized system, i.e., there is one block for each band. The rationale for imposing this constraint is that the transformer parameters in a given band are linear combinations of the original parameters in the same band (and not in any of the other bands). This is illustrated by the example below.

As an example, consider the case where the dimension D is 6, and there are 3 bands each comprising 2 dimensions. An example of a mean and covariance is:

$\mu_i = [0.1\ 0.3\ -0.5\ 05]$ $$\Sigma_i = \begin{bmatrix} 0.1 & 0.2 & 1 & 2 \\ 0.2 & 0.5 & -1 & 4 \\ 1 & 0.5 & 3 & -2 \\ 2 & -1 & -2 & 2 \end{bmatrix}$$

An example of a band-constrained transformation is:

$$A = \begin{bmatrix} a_{11} & a_{12} & 0 & 0 \\ a_{21} & a_{22} & 0 & 0 \\ 0 & 0 & a_{33} & a_{34} \\ 0 & 0 & a_{43} & a_{44} \end{bmatrix}$$

If the transformation is applied on the mean, it leads to:

$$\hat{\mu}_i = \begin{bmatrix} a_{11} * 0.1 + a_{22} * 0.3 \\ a_{21} * 0.1 + a_{22} * 0.3 \\ a_{33} * (-0.5) + a_{34} * 0.5 \\ a_{43} * (-0.5) + a_{44} * 0.5 \end{bmatrix}$$

Thus in step 104, this transform is applied to the atoms directly, since all atoms in the same band share the same transform. As a result, in step 106, the hierarchy and index mappings associated with the original, unadapted acoustic models are preserved. Advantageously, only the means of atoms are changed. The adapted acoustic models are then output, in step 108, and stored in the acoustic model store 18 for use in decoding subsequent real-time speech segments.

In one preferred embodiment, the 20 bands are designed as follows: (i) the feature space is 39-dimensional; and (ii) the first band represents the first dimension and successive bands represent pairs of consecutive dimensions. Therefore the MLLR transform has just 77 parameters (19 of 2×2 blocks plus one) to be estimated. Therefore, the adaptation only involves a matrix-vector multiplication which costs 77 float multiplications and 38 float additions. All these operations can be done with negligible computation on most processing devices.

We tested our block-constrained adaptation technique on a number of test sets that included very short utterances (2–8 words per utterance). In one particular embodiment, we tested the performance of a block-constrained transformation, where the transformation was estimated to maximize the likelihood of the adaptation data. The adaptation provided an improvement of 10%–20% relative over the speaker independent performance on all test sets, with the computational cost of the adaptation being negligible.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of performing speaker adaptation of acoustic models in a band-quantized speech recognition system, the system including one or more acoustic models represented by a feature space of multi-dimensional gaussians, whose dimensions are partitioned into bands, and gaussian means and covariances within each band are quantized into atoms, the method comprising of the steps of:

obtaining a decoded segment of a speech signal associated with a particular speaker;

computing at least one adaptation mapping based on the decoded segment; and applying the at least one adaptation mapping to the atoms of the acoustic models to generate one or more acoustic models adapted to the particular speaker.

2. The method of claim 1, wherein the at least one adaptation mapping is constrained to account for division of the dimensions of the feature space into bands.

3. The method of claim 1, wherein the at least one adaptation mapping is one of a linear and non-linear transform.

4. The method of claim 3, wherein the transform is constrained to be block diagonal with blocks corresponding to the dimension bands.

5. The method of claim 4, wherein the transform is computed to maximize the likelihood of adaptation data.

6. The method of claim 4, wherein the transform is computed to maximize discrimination between phonetic classes.

7. The method of claim 1, wherein the at least one adaptation mapping estimates new gaussian parameters to maximize a probability of a class assignment conditioned on acoustic observations.

8. The method of claim 7, wherein the adaptation process includes an assignment with some probability of each feature vector in adaptation data to a class, and the accumulation of first and second order statistics of the feature vectors for each atom.

9. The method of claim 7, wherein a probability of assigning a feature vector to a class is computed using the quantized gaussians which are speaker independent.

10. The method of claim 7, wherein statistics collected from adaptation data for each atom are smoothed back to statistics of the atoms which are speaker independent, and the smoothed statistics are then converted into gaussians which represent the new atoms.

11. The method of claim 1, wherein the system is used in accordance with a real-time application.

12. Apparatus for performing speaker adaptation of acoustic models in a band-quantized speech recognition system, the system including one or more acoustic models represented by a feature space of multi-dimensional gaussians, whose dimensions are partitioned into bands, and gaussian means and covariances within each band are quantized into atoms, the apparatus comprising:

at least one processing device operative to: (i) obtain a decoded segment of a speech signal associated with a particular speaker; (ii) compute at least one adaptation mapping based on the decoded segment; and (iii) apply the at least one adaptation mapping to the atoms of the acoustic models to generate one or more acoustic models adapted to the particular speaker; and memory, coupled to the at least one processing device, for storing at least a portion of results associated with one or more of the operations performed by the at least one processing device.

13. The apparatus of claim 12, wherein the at least one adaptation mapping is constrained to account for division of the dimensions of the feature space into bands.

14. The apparatus of claim 12, wherein the at least one adaptation mapping is one of a linear and non-linear transform.

15. The apparatus of claim 14, wherein the transform is constrained to be block diagonal with blocks corresponding to the dimension bands.

16. The apparatus of claim 15, wherein the transform is computed to maximize the likelihood of adaptation data.

17. The apparatus of claim 15, wherein the transform is computed to maximize discrimination between phonetic classes.

18. The apparatus of claim 12, wherein the at least one adaptation mapping estimates new gaussian parameters to maximize a probability of a class assignment conditioned on acoustic observations.

19. The apparatus of claim 18, wherein the adaptation process includes an assignment with some probability of each feature vector in adaptation data to a class, and the accumulation of first and second order statistics of the feature vectors for each atom.

20. The apparatus of claim 18, wherein a probability of assigning a feature vector to a class is computed using the quantized gaussians which are speaker independent.

21. The apparatus of claim 18, wherein statistics collected from adaptation data for each atom are smoothed back to statistics of the atoms which are speaker independent, and the smoothed statistics are then converted into gaussians which represent the new atoms.

22. The apparatus of claim 12, wherein the system is used in accordance with a real-time application.

23. An article of manufacture for performing speaker adaptation of acoustic models in a band-quantized speech recognition system, the system including one or more acoustic models represented by a feature space of multi-dimensional gaussians, whose dimensions are partitioned into bands, and gaussian means and covariances within each band are quantized into atoms, comprising a machine readable medium containing one or more programs which when executed implement the steps of:

obtaining a decoded segment of a speech signal associated with a particular speaker;

computing at least one adaptation mapping based on the decoded segment; and applying the at least one adaptation mapping to the atoms of the acoustic models to generate one or more acoustic models adapted to the particular speaker.

24. Apparatus for performing speaker adaptation of acoustic models in a band-quantized speech recognition system, the system including one or more acoustic models represented by a feature space of multi-dimensional gaussians, whose dimensions are partitioned into bands, and gaussian means and covariances within each band are quantized into atoms, the apparatus comprising:

means for obtaining a decoded segment of a speech signal associated with a particular speaker;

means for computing at least one adaptation mapping based on the decoded segment; and means for applying the at least one adaptation mapping to the atoms of the acoustic models to generate one or more acoustic models adapted to the particular speaker.

* * * * *